(12) United States Patent
Gormley (10) Patent No.: US 10,731,738 B2
(45) Date of Patent: Aug. 4, 2020

(54) KINEMATIC SYSTEM WITH MOTION CONTROL DEVICE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 58 days.

(21) Appl. No.: 16/200,708

(22) Filed: Nov. 27, 2018

(65) Prior Publication Data

US 2019/0162280 A1    May 30, 2019

Related U.S. Application Data

(60) Provisional application No. 62/590,955, filed on Nov. 27, 2017.

(51) Int. Cl.
| | | |
|---|---|---|
| *F16H 25/20* | (2006.01) | |
| *F02K 1/76* | (2006.01) | |
| *F16H 25/22* | (2006.01) | |
| *F16H 25/18* | (2006.01) | |

(52) U.S. Cl.
CPC ......... *F16H 25/2056* (2013.01); *F02K 1/763* (2013.01); *F02K 1/766* (2013.01); *F16H 25/186* (2013.01); *F16H 25/2204* (2013.01)

(58) Field of Classification Search
CPC .... F16H 25/20; F16H 25/2056; F16H 25/186; F16H 25/2204; F02K 1/763; F02K 1/766
See application file for complete search history.

(56) References Cited

U.S. PATENT DOCUMENTS

| | | |
|---|---|---|
| 3,511,055 A | 5/1970 | Timms |
| 3,621,763 A | 11/1971 | Geyer |
| 3,829,020 A | 8/1974 | Stearns |
| 4,278,220 A | 7/1981 | Johnston et al. |

(Continued)

FOREIGN PATENT DOCUMENTS

| | | |
|---|---|---|
| EP | 0801221 A2 | 10/1997 |
| EP | 2075488 A1 | 7/2009 |
| WO | 2009122026 A1 | 10/2009 |

OTHER PUBLICATIONS

EP search report for EP18208696.7 dated Apr. 10, 2019.

(Continued)

*Primary Examiner* — David M Fenstermacher
(74) *Attorney, Agent, or Firm* — Getz Balich LLC (57) ABSTRACT

A kinematic system is provided that includes an outer cylinder, a mid-cylinder and an inner cylinder. The mid-cylinder is within the outer cylinder, and mated with the outer cylinder at a mid-outer threaded interface configured to transform axial translation of the outer cylinder into rotational motion of the mid cylinder along an axis. The inner cylinder is within the mid-cylinder, and mated with the mid-cylinder at a mid-inner threaded interface configured to transform the rotational movement of the mid-cylinder into axial translation of the inner cylinder along the axis. A first one of the mid-outer threaded interface and the mid-inner threaded interface includes a thread configured with a first thread portion and a second thread portion. The first thread portion is disposed at a first angle relative to the axis. The second thread portion is disposed at a second angle relative to the axis that is different from the first angle.

20 Claims, 11 Drawing Sheets

(56) References Cited

U.S. PATENT DOCUMENTS

| | | | |
|---|---|---|---|
| 4,519,561 A | 5/1985 | Timms | |
| 4,564,160 A | 1/1986 | Vermilye | |
| 4,807,434 A | 2/1989 | Jurich | |
| 4,909,442 A | 3/1990 | Fernz | |
| 5,144,851 A | 9/1992 | Grimm et al. | |
| 5,228,641 A | 7/1993 | Remlaoui | |
| 5,309,711 A | 5/1994 | Matthias | |
| 5,373,743 A | 12/1994 | Abrahams | |
| 5,927,647 A | 7/1999 | Masters et al. | |
| 6,036,238 A | 3/2000 | Lallament | |
| 6,167,694 B1 | 1/2001 | Davies | |
| 6,170,254 B1 | 1/2001 | Cariola | |
| 6,340,135 B1 | 1/2002 | Barton | |
| 6,434,927 B1 | 8/2002 | Stretton | |
| 6,584,763 B2 | 7/2003 | Lymons et al. | |
| 6,845,946 B2 | 1/2005 | Lair | |
| 6,895,742 B2 | 5/2005 | Lair et al. | |
| 7,146,796 B2 | 12/2006 | Lair | |
| 7,264,203 B2 | 9/2007 | Lair | |
| 7,513,101 B2 | 4/2009 | Eschborn et al. | |
| 7,883,054 B2* | 2/2011 | Elliott | F16H 25/205 244/99.9 |
| 7,938,473 B2* | 5/2011 | Paton | B60J 5/101 296/146.8 |
| 8,015,889 B2* | 9/2011 | Wingett | F16H 25/20 384/507 |
| 8,109,163 B2* | 2/2012 | Hudson | B64C 25/24 74/89.25 |
| 8,109,466 B2 | 2/2012 | Aten et al. | |
| 8,562,281 B2* | 10/2013 | Arnett | F01D 17/26 415/1 |
| 8,615,982 B2 | 12/2013 | Sundstrom et al. | |
| 9,174,724 B2* | 11/2015 | Sakota | B64C 9/22 |
| 9,206,765 B2 | 12/2015 | Vauchel | |
| 9,352,185 B2* | 5/2016 | Hendrickson | A63B 22/0023 |
| 9,394,738 B2* | 7/2016 | Bochen | B60J 5/102 |
| 9,562,595 B2 | 2/2017 | Caruel et al. | |
| 9,689,188 B2* | 6/2017 | Fischer | F16H 25/20 |
| 9,764,464 B2* | 9/2017 | Sarh | B25J 9/106 |
| 10,180,136 B2* | 1/2019 | Sprocq | F04C 2/084 |
| 10,355,554 B2* | 7/2019 | Parmar | E02F 3/422 |
| 10,415,677 B2* | 9/2019 | Horn | F16H 25/2056 |
| 2007/0137331 A1 | 6/2007 | Kachouh | |
| 2010/0192715 A1* | 8/2010 | Vauchel | F02K 1/763 74/89.35 |
| 2010/0205931 A1 | 8/2010 | Baudu et al. | |
| 2010/0270428 A1 | 10/2010 | Murphy | |
| 2011/0062279 A1 | 3/2011 | Welch et al. | |
| 2011/0167790 A1 | 7/2011 | Cloft et al. | |
| 2012/0067975 A1 | 3/2012 | Vauchel | |
| 2012/0187214 A1 | 7/2012 | Welch | |
| 2013/0075492 A1 | 3/2013 | Welch et al. | |
| 2013/0160425 A1 | 6/2013 | Scanlon et al. | |
| 2013/0186219 A1 | 7/2013 | Jones | |
| 2013/0284822 A1 | 10/2013 | Howarth et al. | |
| 2017/0167440 A1 | 6/2017 | Aten | |

OTHER PUBLICATIONS

SKYBrary, "Cascade Reverser", from SKYBrary Wiki, Dec. 9, 2013.

Collins, "Common Ball Screw Terms Explained", Linear Motion Tips, https://www.linearmotiontips.com/common-ball-screw-terms-explained/, Oct. 8, 2015.

\* cited by examiner

KINEMATIC SYSTEM WITH MOTION CONTROL DEVICE

CROSS-REFERENCE TO RELATED APPLICATIONS

This application claims priority to U.S. Provisional Patent Appln. No. 62/590,955 filed Nov. 27, 2017, which is hereby incorporated herein by reference in its entirety.

BACKGROUND

1. Technical Field

This disclosure relates generally to a kinematic system and, more particularly, to a kinematic system with a motion control device such as, for example, a lost-motion control device.

2. Background Information

Various types and configurations of actuators and motion control devices are known in the art. While these known actuators and motion control devices have various benefits, there is still room in the art for improvement. For example, there is a need in the art for a motion control device operable to facilitate movement of two different components relative to one another and at different variable rates.

SUMMARY OF THE DISCLOSURE

According to an aspect of the present disclosure, a kinematic system is provided that includes an outer cylinder, a mid-cylinder and an inner cylinder. The mid-cylinder is within the outer cylinder, and is mated with the outer cylinder at a mid-outer threaded interface configured to transform axial translation of the outer cylinder into rotational motion of the mid cylinder along an axis. The inner cylinder is within the mid-cylinder, and is mated with the mid-cylinder at a mid-inner threaded interface configured to transform the rotational movement of the mid-cylinder into axial translation of the inner cylinder along the axis. A first one of the mid-outer threaded interface and the mid-inner threaded interface includes a thread configured with a first thread portion and a second thread portion. The first thread portion is disposed at a first angle relative to the axis. The second thread portion is disposed at a second angle relative to the axis that is different from the first angle.

According to another aspect of the present disclosure, another kinematic system is provided that includes an outer cylinder, a mid-cylinder and an inner cylinder. The mid-cylinder is within the outer cylinder, and is mated with the outer cylinder at a mid-outer threaded interface configured to convert axial translation of the outer cylinder to rotational movement of the mid-cylinder along an axis. The inner cylinder is within the mid-cylinder, and is mated with the mid-cylinder at a mid-inner threaded interface configured to convert the rotational movement of the mid-cylinder into axial translation of the inner cylinder along the axis. A first one of the mid-outer threaded interface and the mid-inner threaded interface includes a thread including a first thread portion and a second thread portion. The first thread portion is configured with a first thread pitch. The second thread portion is configured with a second thread pitch that is different from the first thread pitch.

According to still another aspect of the present disclosure, another kinematic system is provided that includes an outer cylinder, a mid-cylinder and an inner cylinder. The mid-cylinder is within the outer cylinder, and is mated with the outer cylinder at a mid-outer threaded interface configured to convert axial translation of the outer cylinder into rotational movement of the mid-cylinder along an axis. The inner cylinder is within the mid-cylinder, and is mated with the mid-cylinder at a mid-inner threaded interface configured to convert the rotational movement of the mid-cylinder into axial translation of the inner cylinder along the axis. A first one of the mid-outer threaded interface and the mid-inner threaded interface includes a thread. A first value of a pitch of the thread at a first location along the axis is different than a second value of the pitch of the thread at a second location along the axis.

The first thread portion may be disposed at a first angle relative to the axis. The second thread portion may be disposed at a second angle relative to the axis that is different from the first angle.

The first angle may be an acute angle and/or the second angle may be a substantially zero angle.

The first thread portion may be acutely offset from the axis. The second thread portion may be substantially parallel with the axis.

The thread may be further configured with a third thread portion disposed at a third angle relative to the axis that is different from the second angle.

The third thread portion may be between the first thread portion and the second thread portion.

The mid-outer threaded interface may be configured as or otherwise include the thread.

The mid-inner threaded interface may be configured as or otherwise include the thread.

A second one of the mid-outer threaded interface and the mid-inner threaded interface may include a second thread. At least a portion of the second thread may be disposed at a third angle relative to the axis that is substantially the same as the first angle.

A second one of the mid-outer threaded interface and the mid-inner threaded interface may include a second thread. At least a portion of the second thread may be disposed at a third angle relative to the axis that is different than the first angle and the second angle.

A second one of the mid-outer threaded interface and the mid-inner threaded interface may include a second thread configured with a third thread portion and a fourth thread portion. The third thread portion may be disposed at a third angle relative to the axis. The fourth thread portion may be disposed at a fourth angle relative to the axis that is different from the third angle.

The thread may be further configured with an intermediate thread portion. The intermediate thread portion may be disposed at an angle relative to the axis that changes as the intermediate thread portion extends along the axis between the first thread portion and the second thread portion.

The kinematic system may also include an outer cylinder mount, a mid-cylinder mount and an inner cylinder mount. The outer cylinder mount may be fixedly connected to the outer cylinder, and configured to attach the outer cylinder to a first component. The mid-cylinder mount may be rotatably, relative to the axis, connected to the mid-cylinder, and configured to attach the mid-cylinder to a second component. The inner cylinder mount may be fixedly connected to the inner cylinder, and configured to attach the outer cylinder to a first component.

The kinematic system may also include a lost-motion control device that includes the outer cylinder, the mid-cylinder and the inner cylinder. The lost-motion control device may be configured such that the outer cylinder axially translates relative to the mid-cylinder during a first portion of axial movement of the mid-cylinder. The lost-motion control device may also or alternatively be configured such that the outer cylinder does not axially translate relative to the mid-cylinder during a second portion of the axial movement of the mid-cylinder.

The lost-motion control device may be further configured such that the inner cylinder axially translates relative to the mid-cylinder during the first portion and the second portion of the axial movement of the mid-cylinder.

The first one of the mid-outer threaded interface and the mid-inner threaded interface may also include a ball screw engaged with the thread.

The kinematic system may also include a fixed structure, a first movable component of a thrust reverser and a second movable component of the thrust reverser. The mid-sleeve may be attached to the fixed structure. The outer cylinder may be attached to the first movable component. The second movable component may be operable to move relative to the first movable component. The inner cylinder may be attached to the second movable component.

The kinematic system may also include a blocker door and a link. The first movable component may include a translating sleeve and a translating cascade. The second movable component may be configured as or otherwise include a translating blocker door carrier. The blocker door may be pivotally connected to the translating blocker door carrier. The link may connect and extend between the blocker door and the first moveable component.

The foregoing features and the operation of the invention will become more apparent in light of the following description and the accompanying drawings.

DETAILED DESCRIPTION

Figure 1:
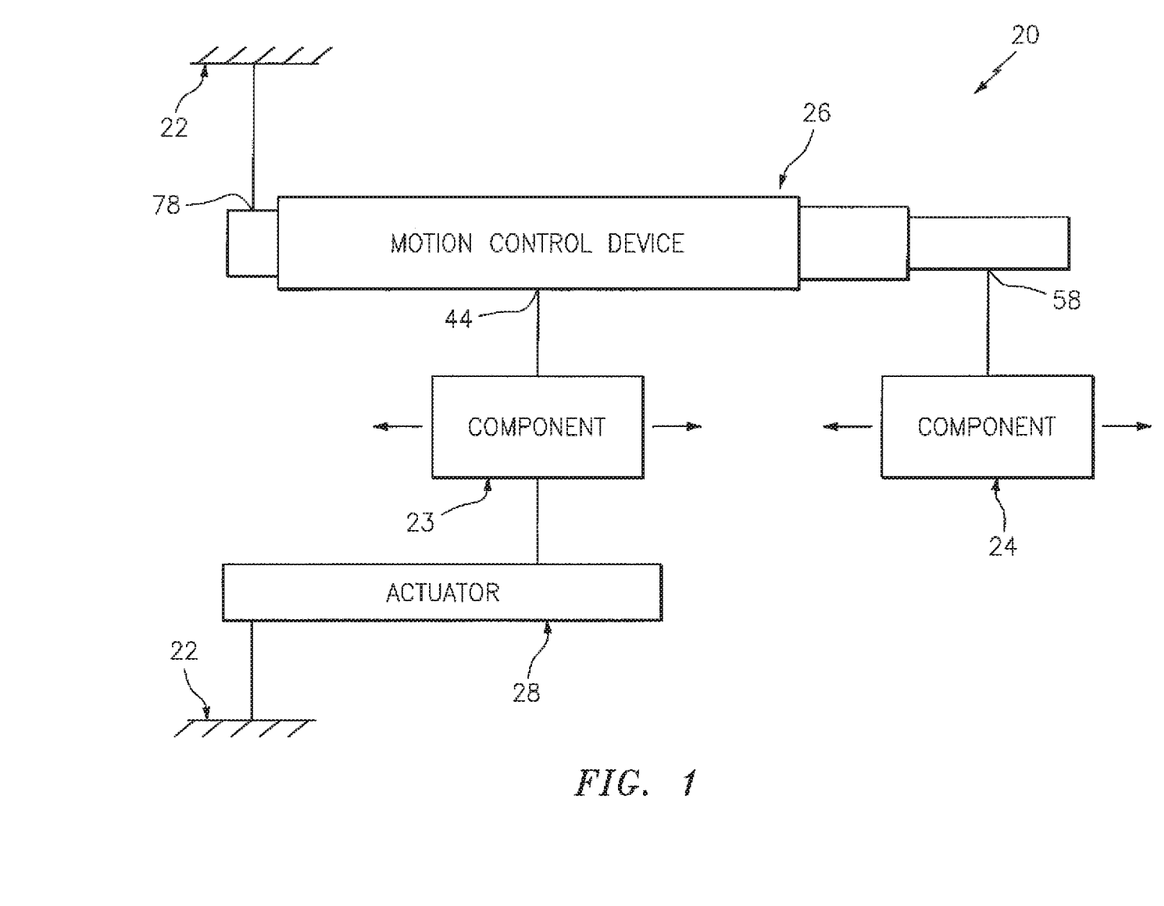
FIG. 1 is a schematic illustration of a kinematic system for an apparatus such as a gas turbine engine aircraft propulsion system.

FIG. 1 is a schematic illustration of a kinematic system 20 for an apparatus such as, but not limited to, a gas turbine engine aircraft propulsion system. This kinematic system 20 includes a plurality of components 22-24 and at least one motion control device 26 (e.g., a lost-motion control device) for controlling relative movement between the components 22-24. The kinematic system 20 of FIG. 1 also includes at least one actuator 28 (e.g., a piston or a lead-screw) for actuating the relative movement between the components 22-24.

The first component 22 of FIG. 1 is configured as a stationary component. The second component 23 of FIG. 1 is configured as a moveable component such as, but not limited to, an axially translatable component. The third component 24 of FIG. 1 is also configured as a moveable component such as, but not limited to, an axially translatable component. The present disclosure, however, is not limited to such exemplary components. For example, in other embodiments, the first component 22 may be configured as one of the aforesaid movable components and the second component 23 or the third component 24 may be configured as the stationary component depending upon the specific configuration of the kinematic system 20 and/or the motion control device 26.

Figure 2:
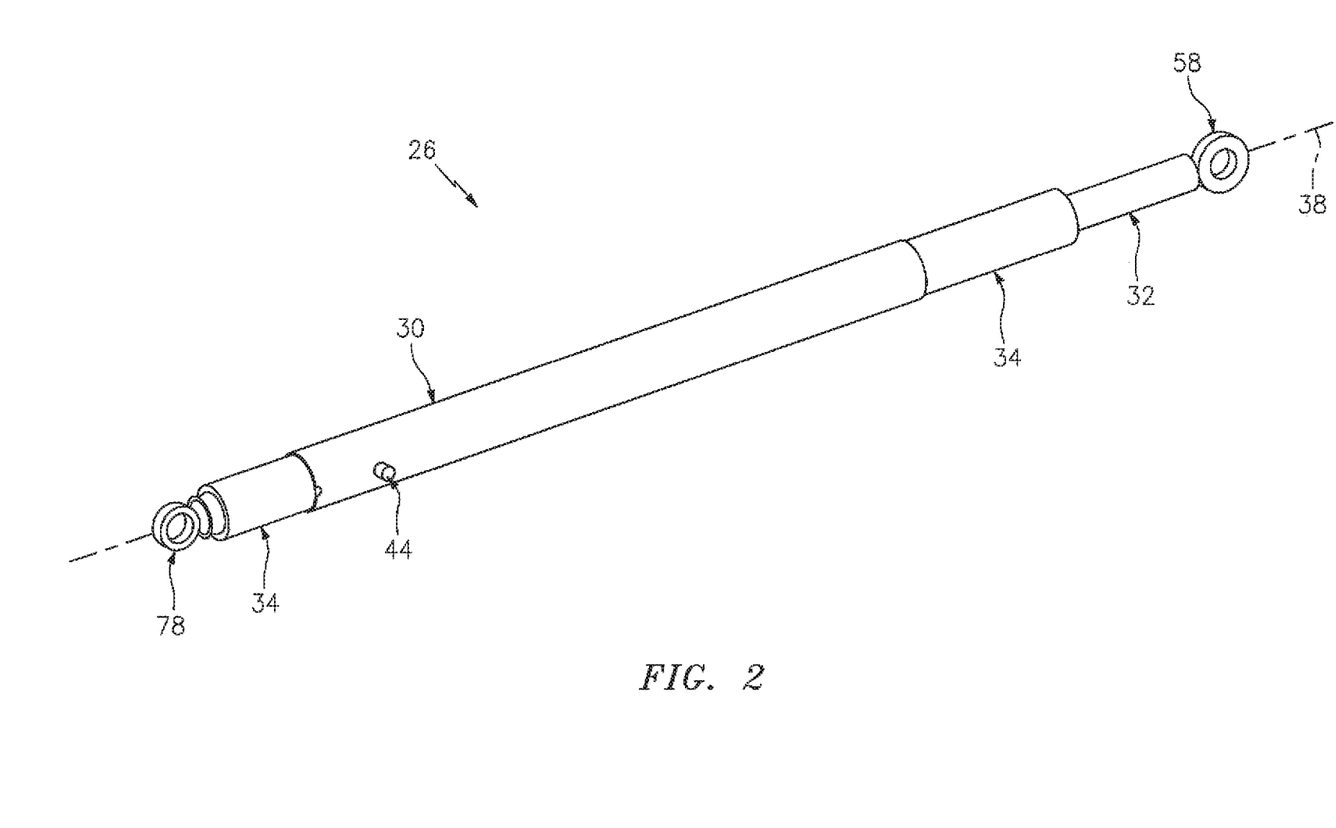
FIG. 2 is a perspective illustration of a motion control device.
Figure 3:
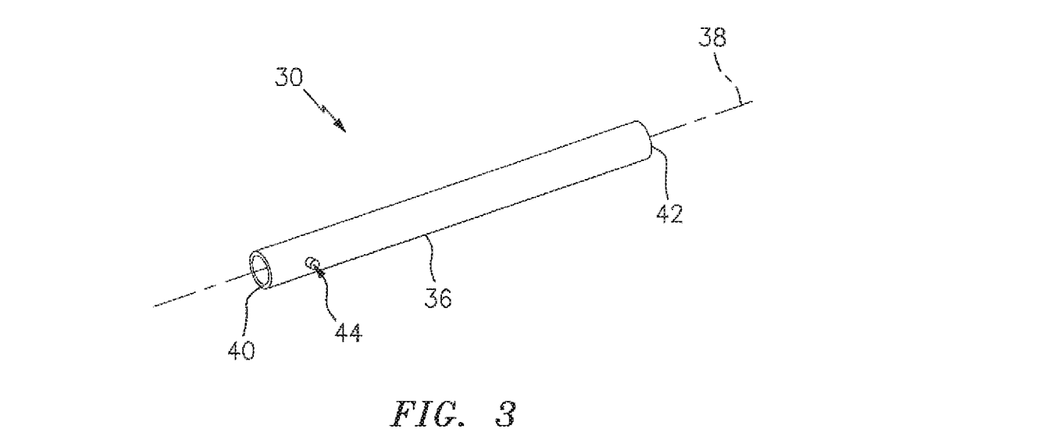
FIG. 3 is a perspective illustration of an outer cylinder of the motion control device.

Referring to FIG. 2, the motion control device 26 includes an outer cylinder 30, an inner cylinder 32 and a mid-cylinder 34. Referring now to FIG. 3, the outer cylinder 30 is configured with a tubular body 36 that extends axially along an axis 38 of the motion control device 26 between opposing first and second ends 40 and 42; e.g., forward and aft ends.

An outer cylinder mount 44 is fixedly mounted to (e.g., formed integral with or immovably attached to) the outer cylinder body 36 proximate, for example, the first end 40. With such a fixed connection, the outer cylinder mount 44 does not move rotationally about or axially along the axis 38 relative to the outer cylinder 30 when connected to the outer cylinder body 36.

Figure 4:
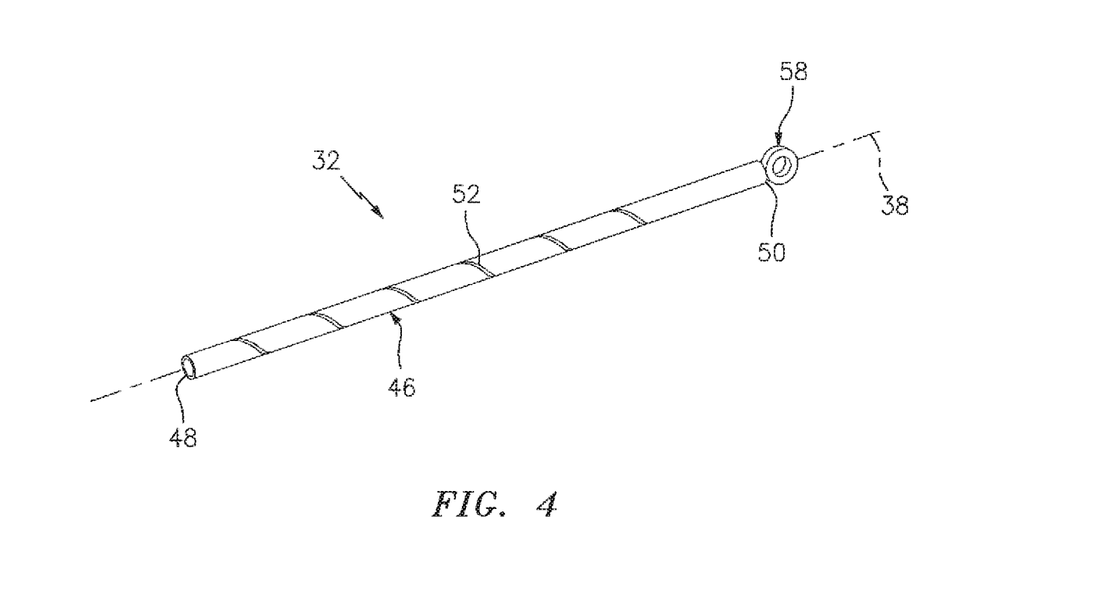
FIG. 4 is a perspective illustration of an inner cylinder of the motion control device.

Referring to FIG. 4, the inner cylinder 32 is configured with a tubular (or solid) body 46 that extends axially along the axis 38 between opposing first and second ends 48 and 50; e.g., forward and aft ends. The inner cylinder 32 of FIG. 4 also includes at least one thread 52. This thread 52 wraps circumferentially around and extends axially along an outer periphery of the tubular body 46 between opposing thread ends. The thread 52 of FIG. 4, for example, spirals around the tubular body 46 between its ends. The first thread end may be located at (e.g., on, adjacent or proximate) the first end 48. The second thread end may be located at the second end 50.

Figure 5:
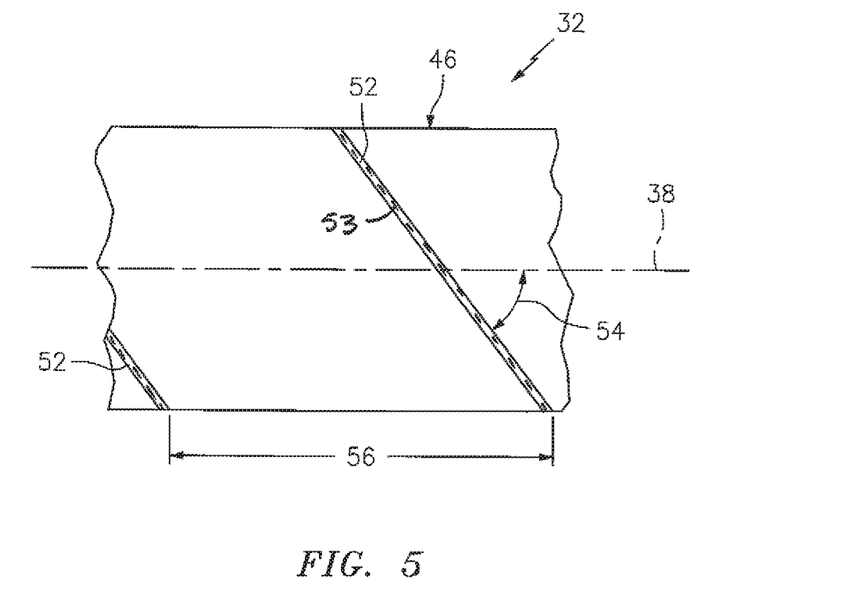
FIG. 5 is a schematic illustration of a threaded portion of the inner cylinder.

Referring to FIG. 5, the thread 52 extends along and follows a longitudinal thread centerline 53 and, thus, the thread 52 is disposed at an angle 54 relative to the axis 38. In the embodiments of FIG. 5, the angle 54 is an acute angle and is constant along an entire longitudinal length of the thread 52. With this configuration, the thread 52 has a substantially (e.g., +/−1% error) or exactly constant thread pitch. The term "thread pitch" is used herein to describe a distance 56 along the axis 38 between a crest of two axially adjacent portions of a thread; e.g., the thread 52. The present disclosure, however, is not limited to such an exemplary embodiment as discussed below in further detail.

Referring to FIG. 4, an inner cylinder mount 58 is fixedly mounted to (e.g., formed integral with or immovably attached to) the inner cylinder 32 at the second end 50. With such a fixed connection, the inner cylinder mount 58 does not move rotationally about or axially along the axis 38 relative to the inner cylinder 32 when connected to the inner cylinder body 46.

Figure 6:
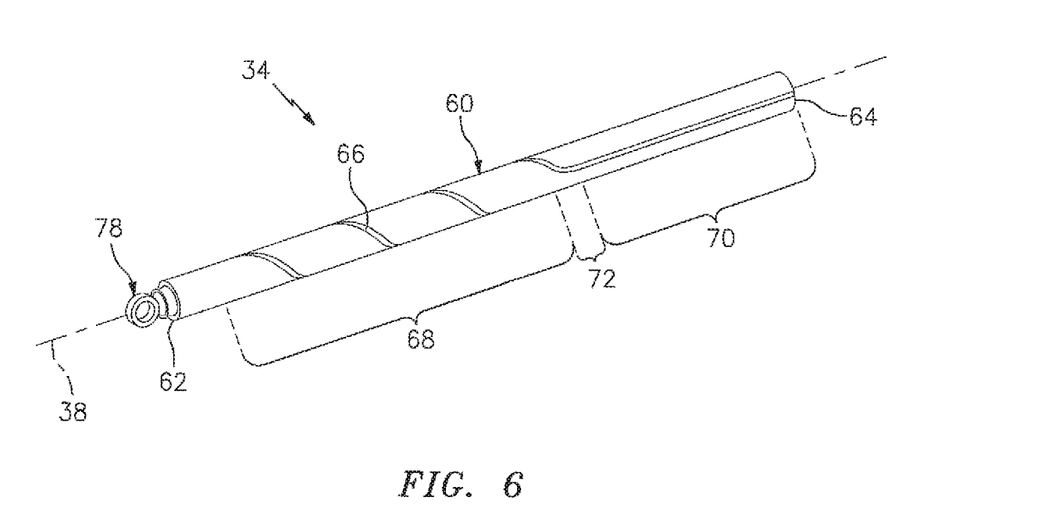
FIG. 6 is a perspective illustration of a mid-cylinder of the motion control device.

Referring to FIG. 6, the mid-cylinder 34 is configured with a tubular body 60 that extends axially along the axis 38 between opposing first and second ends 62 and 64; e.g., forward and aft ends. The mid-cylinder 34 of FIG. 6 also includes at least one thread 66. This thread 66 wraps circumferentially around and extends axially along an outer periphery of the tubular body 60 between opposing thread ends. The thread 66 of FIG. 6, for example, includes a first (e.g., forward) thread portion 68 (see also FIG. 7), a second (e.g., aft) thread portion 70 (see also FIG. 8) and an intermediate (e.g., transition) thread portion 72 (see also FIG. 9). The first thread portion 68 spirals around the tubular body 60 from the first end of the thread 66 to the intermediate thread portion 72. The second thread portion 70 extends axially along the tubular body 60 (without wrapping circumferentially) from the intermediate thread portion 72 to the second end of the thread 66. The intermediate thread portion 72 extends and provides a transition between the first thread portion 68 and the second thread portion 70. The first thread end may be located at (e.g., on, adjacent or proximate) the first end 62; see FIG. 6. The second thread end may be located at the second end 64.

Figure 7:
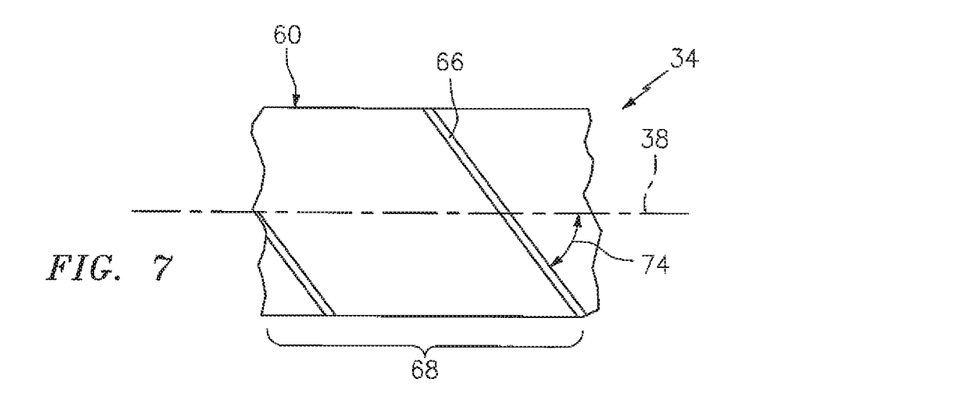
FIG. 7 is a schematic illustration of a threaded portion of the mid-cylinder.

The thread 66 extends along and follows a longitudinal thread centerline. Referring to FIG. 7, within the first thread portion 68, the centerline and, thus, the thread 66 is disposed at a first angle 74 relative to the axis 38. This first angle 74 may be substantially (e.g., within +/−2°) or exactly the same as the angle 54 in FIG. 5. Thus, the first thread portion 68 is provided with a first thread pitch that is substantially or exactly the same as the thread pitch of the thread 52 in FIG. 5. However, in other embodiments, these angles and thread pitches may be different.

Figure 8:
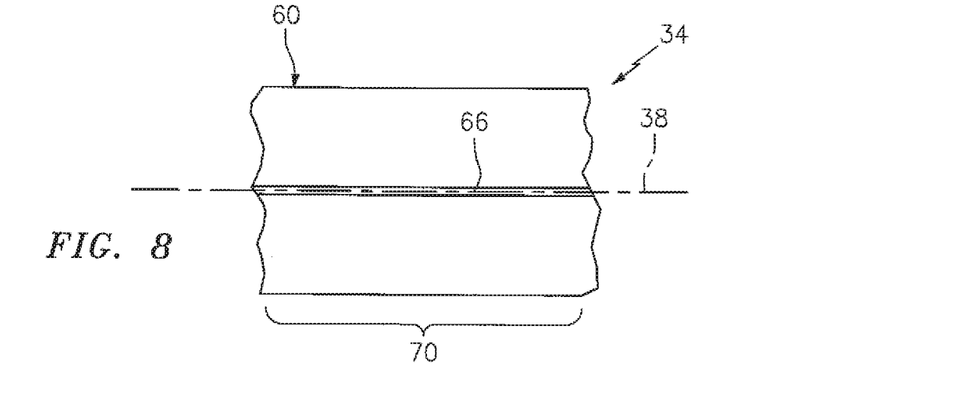
FIG. 8 is a schematic illustration of another threaded portion of the mid-cylinder.

Referring to FIG. 8, within the second thread portion 70, the centerline and, thus, the thread 66 is disposed at a second angle (not visible in FIG. 8) relative to the axis 38. This second angle is different than the first angle 74 of FIG. 7. In the embodiment of FIG. 8, for example, the second angle is a substantially zero (or one-hundred and eighty) degree angle; however, in other embodiments, the second angle may be a non-zero angle such that the thread 66 spirals at least partially around the body 60 in the second thread portion 70. Referring again to the embodiment of FIG. 8, the second thread portion 70 is at least substantially parallel with the axis 38. The second thread portion 70 thereby has a second thread pitch that is different from the first thread pitch of the first thread portion 68. The second thread pitch of the second thread portion 70 may be referred to as an infinite thread pitch since the second thread portion 70 does not include two axially adjacent portions of thread 66.

Figure 9:
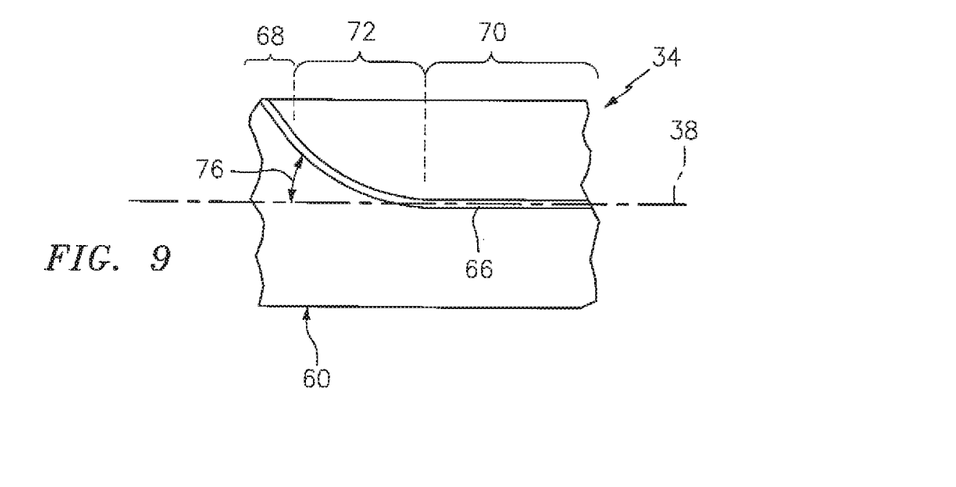
FIG. 9 is a schematic illustration of still another threaded portion of the mid-cylinder.

Referring to FIG. 9, within the intermediate thread portion 72, the centerline and, thus, the thread 66 is disposed at a third angle 76 relative to the axis 38. However, whereas the first angle 74 of FIG. 7 and the second angle of FIG. 8 are substantially constant, the third angle 76 (e.g., gradually/smoothly) changes as the intermediate thread portion 72 extends along its centerline between the first thread portion 68 and the second thread portion 70. Thus, the third angle 76 gradually transitions from the first angle 74 to the second angle. The present disclosure, however, is not limited to the foregoing thread embodiment as discussed below in further detail.

Referring to FIG. 6, a mid-cylinder mount 78 is rotatably mounted—relative to the axis 38—to the mid-cylinder 34 at the first end 62. With such a rotatable connection, the mid-cylinder mount 78 may rotate about the axis 38 relative to the mid-cylinder 34 when connected to the mid-cylinder body 60. This enables the mid-cylinder 34 to rotate relative to the outer and the inner cylinders 30 and 32 as described below in further detail. However, the mount 78 is axially fixed relative to the body 60.

Figure 10:
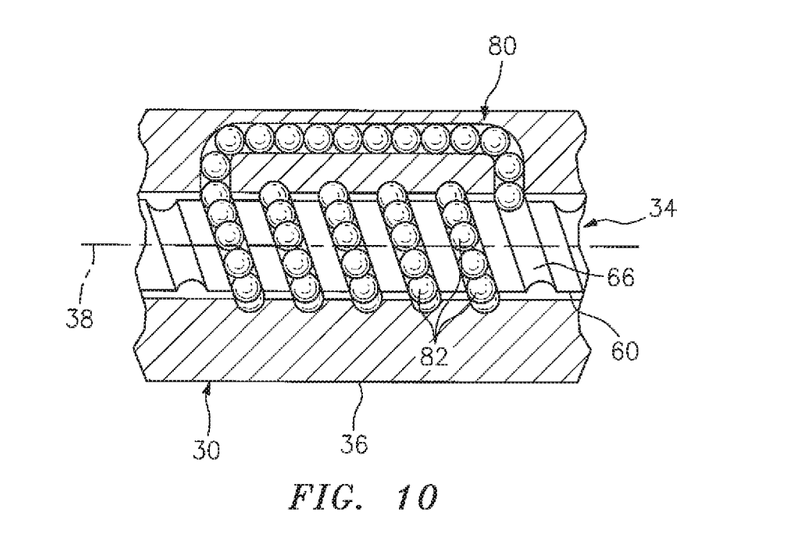
FIG. 10 is a cutaway illustration of a threaded interface between the outer cylinder and the mid-cylinder.

Referring to FIG. 2, the mid-cylinder 34 is arranged within and projects axially through a bore of the outer cylinder 30. The mid-cylinder 34 is mated with the outer cylinder 30 at a mid-outer threaded interface configured to transform axial translation of the outer cylinder 30 to rotation of the mid-cylinder 34 along the axis 38, or alternatively to transform rotational movement of the mid-cylinder 34 into axial translation of the outer cylinder 30 along the axis 38. An exemplary embodiment of such a threaded interface is illustrated in FIG. 10. This threaded interface includes the thread 66 as well as at least one ball screw 80, where ball bearings 82 of the ball screw 80 are engaged with and move through the thread 66. In the embodiment of FIG. 10, the thread 66 is configured as a channel cut into or otherwise formed in the outer periphery of the mid-cylinder body 60. However, in other embodiments, the thread 66 may project out from the outer periphery of the mid-cylinder body 60 and the ball bearings 82 may be disposed on opposing sides of the thread 66.

Figure 11:
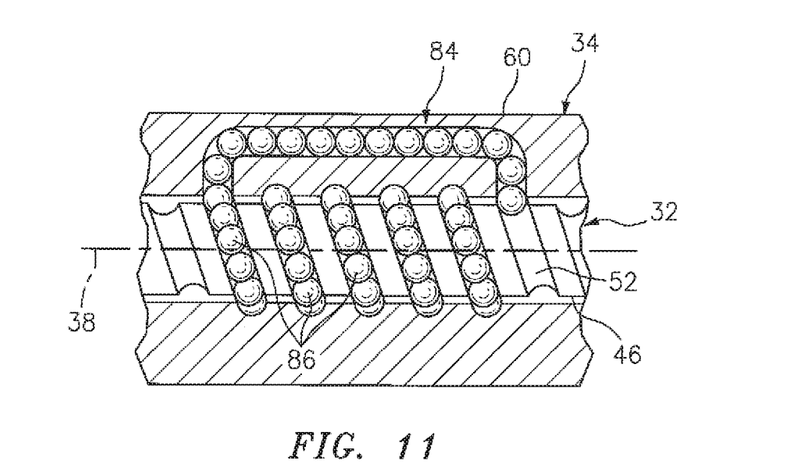
FIG. 11 is a cutaway illustration of a threaded interface between the mid-cylinder and the inner cylinder.
Figure 12A:
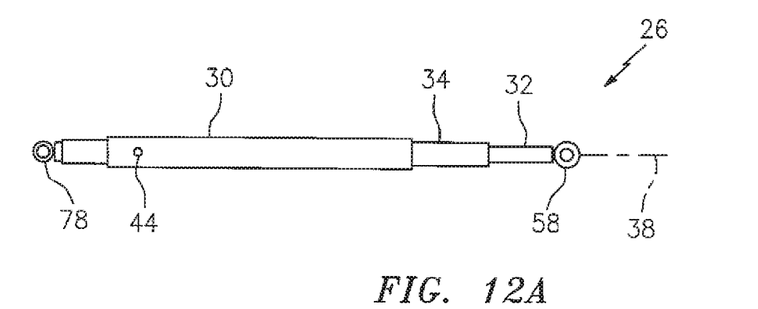
FIGS. 12A-12D and 13A-13D illustrate a sequence of the motion control device moving from a first configuration to a second configuration.
Figure 12B:
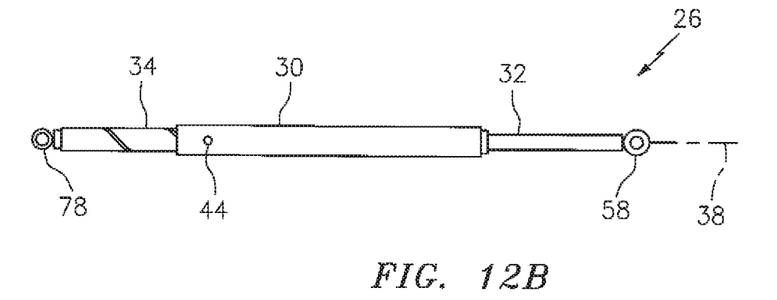
Figure 12C:
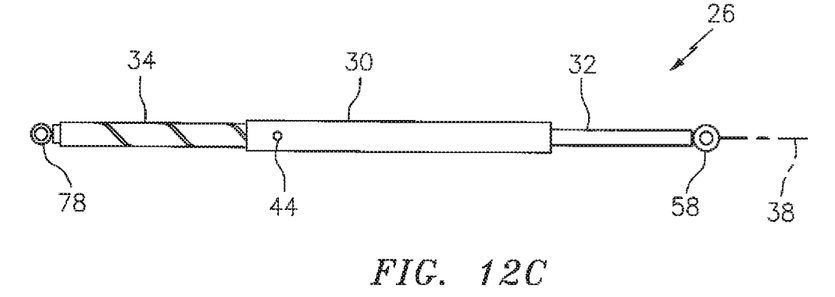
Figure 12D:
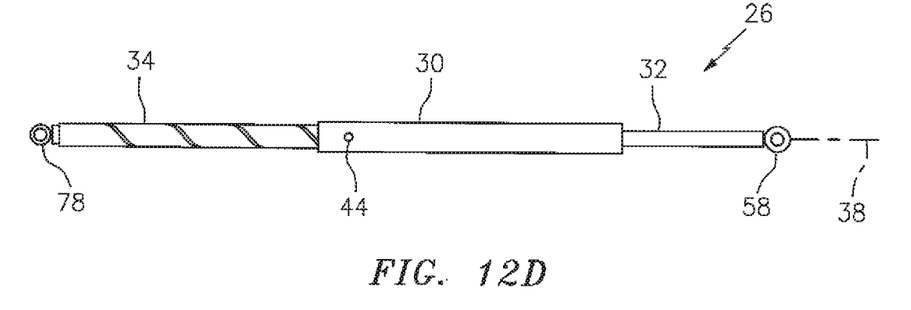

Referring again to FIG. 2, the inner cylinder 32 is arranged within and projects axially through a bore of the mid-cylinder 34. The inner cylinder 32 is mated with the mid-cylinder 34 at a mid-inner threaded interface configured to transform the rotational movement of the mid-cylinder 34 into axial translation of the inner cylinder 32 along the axis 38. An exemplary embodiment of such a threaded interface is illustrated in FIG. 11. This threaded interface includes the thread 52 as well as at least one ball screw 84, where ball bearings 86 of the ball screw 84 are engaged with and move through the thread 52. In the embodiment of FIG. 11, the thread 52 is configured as a channel cut into or otherwise formed in the outer periphery of the mid-cylinder body 46. However, in other embodiments, the thread 52 may project out from the outer periphery of the mid-cylinder body 46 and the ball bearings 86 may be disposed on opposing sides of the thread 52.

Referring to FIG. 1, the outer cylinder mount 44 is secured (e.g., directly) to the second component 23. The inner cylinder mount 58 is secured (e.g., directly) to the third component 24. The mid-cylinder mount 78 is secured (e.g., directly) to the first component 22. The actuator 28 is connected to and disposed between the first component 22 and the second component 23. With such a configuration, the actuator 28 may be operated to axially translate the second component 23. Driven by the axial movement of the second component 23, the motion control device 26 may then cause the third component 24 to also axially translate as described below with reference to FIGS. 12A-12D and 13A-13D.

Figure 13A:
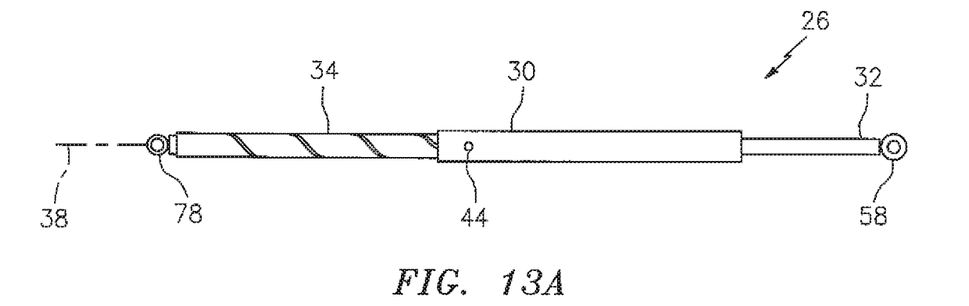
Figure 13B:
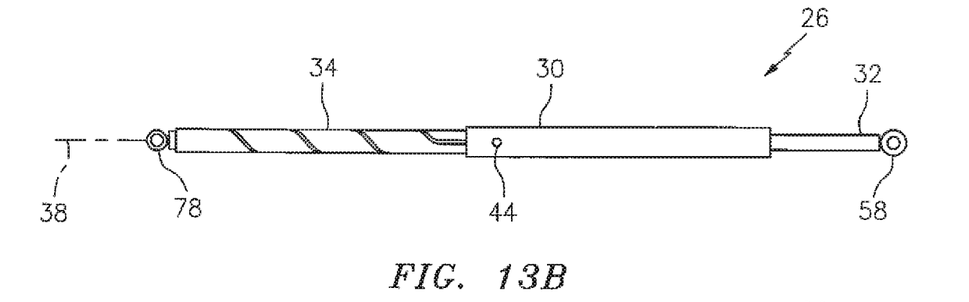
Figure 13C:
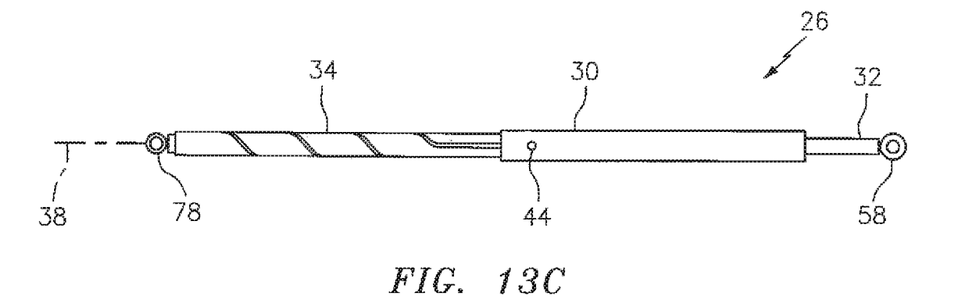
Figure 13D:
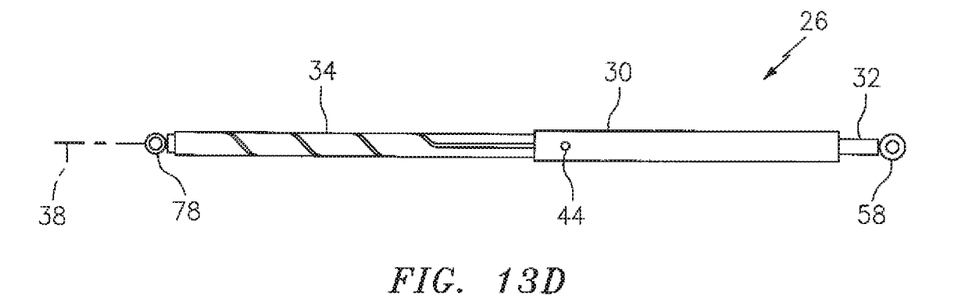

FIGS. 12A-12D and 13A-13D illustrate a sequence of the motion control device 26 moving from a first configuration (e.g., a stowed or closed configuration of FIG. 12A) to a second configuration (e.g., a deployed or open configuration of FIG. 13D). During this movement, the axial translation of the second component 23 causes the outer cylinder mount 44 to be moved axially away from the axially stationary mid-cylinder mount 78. This in turn causes the mid-cylinder 34 to rotate about the axis 38 during the motion of FIGS. 12A-12D due to the mid-outer threaded interface of FIG. 10. Rotation of the mid-cylinder 34 causes the inner cylinder 32 to translate axially relative to the mid-cylinder 34 due to the mid-inner threaded interface of FIG. 11. As a result, the inner cylinder mount 58 moves axially away from the axially stationary mid-cylinder mount 78 thereby causing the third component 24 (see FIG. 1) to translate axially aft during the motion of FIGS. 12A-12D. Where the first and the second thread slopes (see FIGS. 5 and 7) are substantially the same, the mounts 44 and 58 translate axially along the axis 38 at substantially the same rate; e.g., note the mounts 44 and 58 travel the same distance between FIGS. 12A-12D. However, when the ball screw 84 of the mid-inner threaded interface (see FIG. 11) reaches the intermediate thread portion 72 (see FIG. 9) and then the second thread portion 70 (see FIG. 8), rotation of the mid-cylinder 34 will slow at the portion 72 and then stop at the portion 70 during the motion of FIGS. 13A-13D. As a result, while the outer cylinder 30 will continue to move axially relative to the mid-cylinder 34, the axial movement of the inner cylinder 32 relative to the mid-cylinder 34 will slow and then stop; e.g., note the mounts 44 and 58 travel different distances between FIGS. 13A-13D. Axial translation of the mount 58 and, thus, the third component 24 (see FIG. 1) will therefore stop as axial translation of the mount 44 and, thus, the second component 23 (see FIG. 1) continues. The second component 23 therefore translates axially relative to both the first component 22 and the third component 23. The motion control device 26 therefore may be referred to as a "lost-motion control device". This enables provision of the second and the third components 23 and 24 with different strokes as well as deployment timing.

Figure 14:
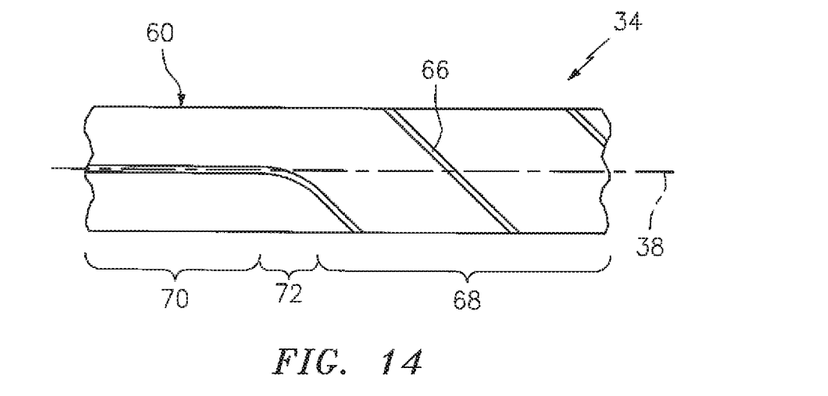
FIG. 14 is a schematic illustration of a portion of another mid-cylinder.

In some embodiments, referring to FIG. 14, the second thread portion 70 may be positioned forward of the first thread portion 68.

Figure 15:
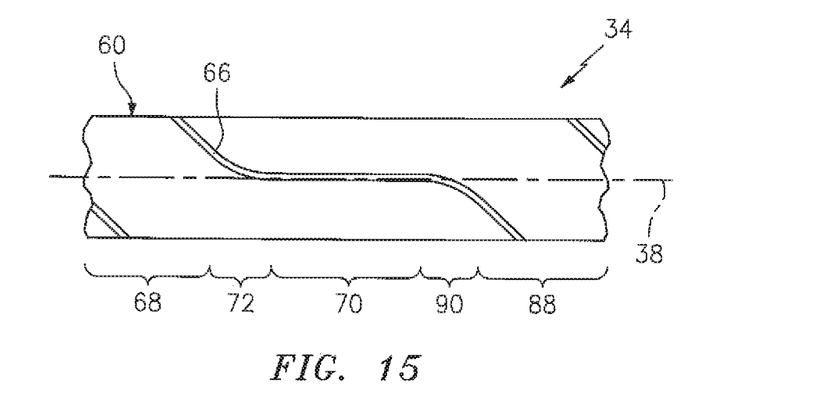
FIG. 15 is a schematic illustration of a portion of still another mid-cylinder.

In some embodiments, referring to FIG. 15, the thread 66 may include one or more additional thread portions 88 and 90. The thread 66 in FIG. 15, for example, includes a third thread portion 88 with a third thread pitch that is at least substantially the same as (or different from) the first thread pitch of the first thread portion 68. The second thread portion 70 is positioned axially between the first thread portion 68 and the third thread portion 88. The thread 66 of FIG. 15 also includes an additional intermediate thread portion 90 providing a (e.g., gradual, smooth) transition between the second thread portion 70 and the third thread portion 88. With such a configuration, the axial translation of the third component 24 will momentary stop (e.g., pause) when the ball screw 80 (see FIG. 10) engages the second thread portion 70 and then resumes movement thereafter when the ball screw 80 engages the third thread portion 88.

In some embodiments, the thread 52 of the inner cylinder 32 may also or alternatively be configured with a plurality of different thread portions as described above with respect to the thread 66.

Figure 16:
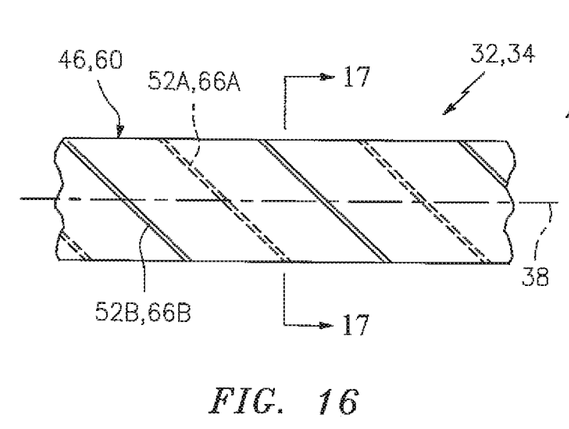
FIG. 16 is a schematic illustration of a portion of another mid-cylinder or inner cylinder.
Figure 17:
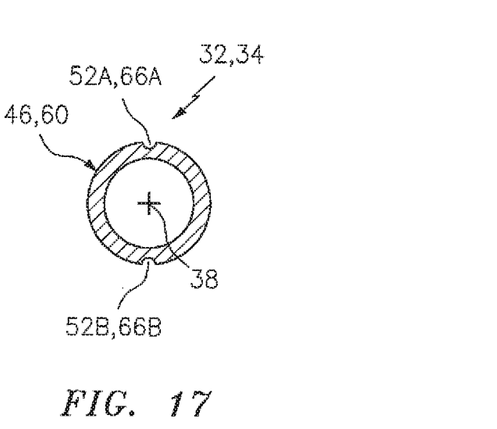
FIG. 17 is a cross-sectional illustration of the cylinder in FIG. 16.
Figure 18A:
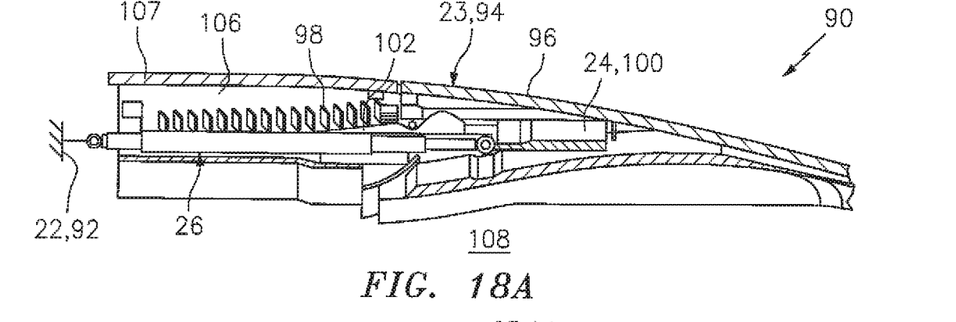
FIGS. 18A-18D and 19A-19C illustrate a sequence of another kinematic system moving from a first configuration to a second configuration.
Figure 18B:
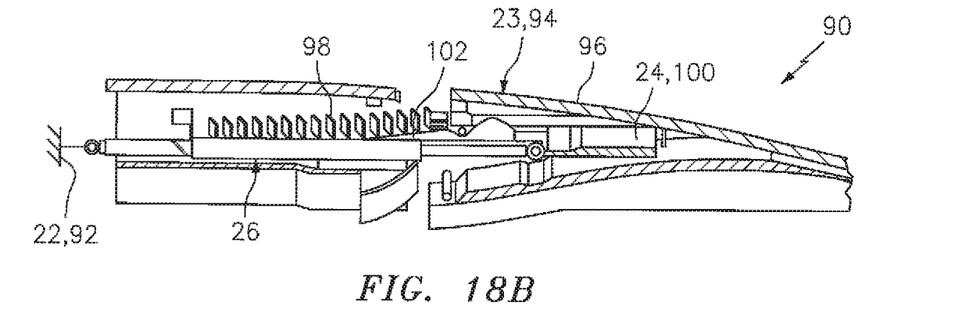
Figure 18C:
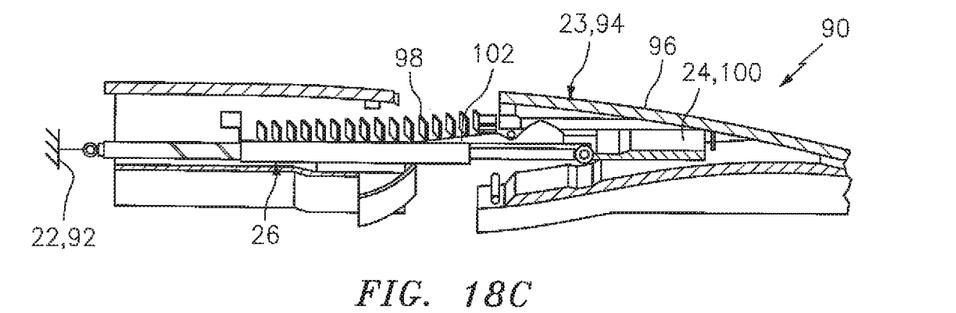
Figure 18D:
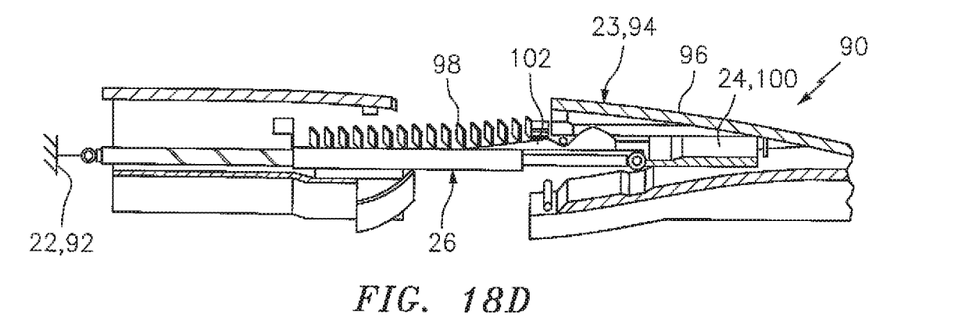

In some embodiments, referring to FIGS. 16 and 17, the thread 52, 66 may be one of a plurality of threads 52A and 52B, 66A and 66B (one shown via a dashed line in FIG. 16 for clarity) disposed about the periphery of the respective cylinder body 46, 60.

Figure 19A:
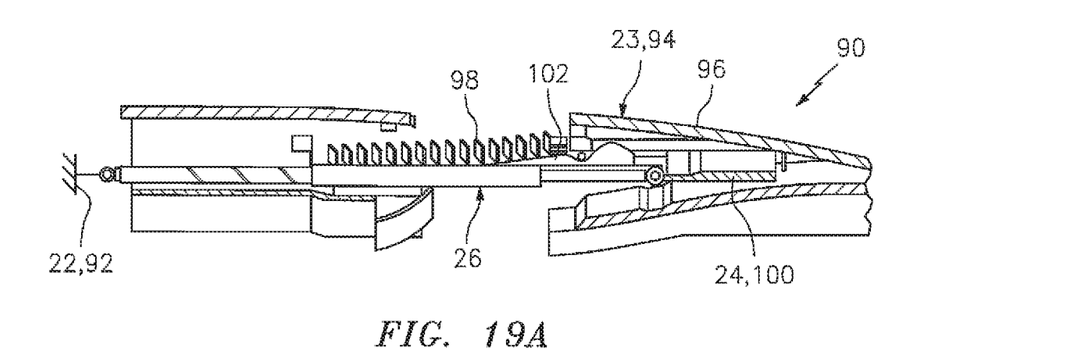
Figure 19B:
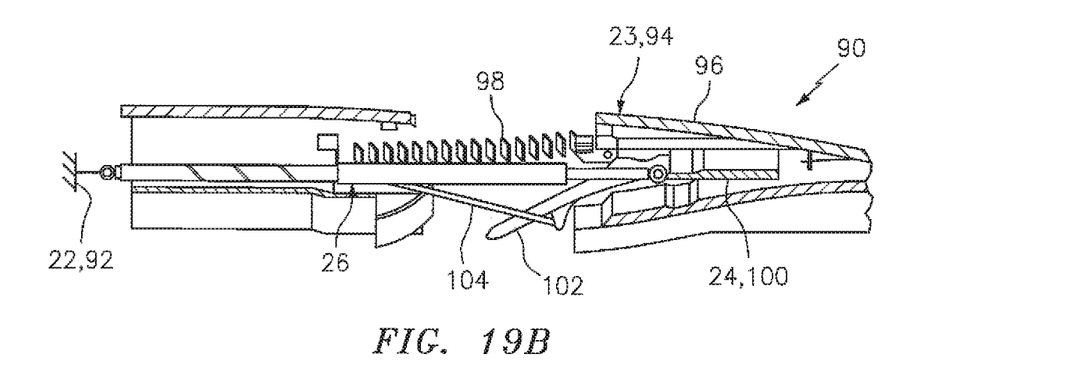
Figure 19C:
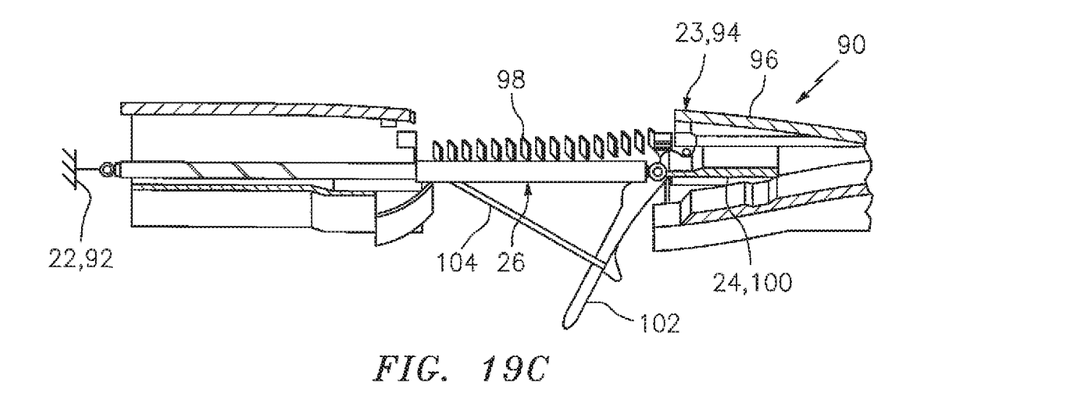

FIGS. 18A-18D and 19A-19C illustrate a sequence of another exemplary kinematic system 90 (e.g., a thrust reverser for an aircraft propulsion system) moving from a first configuration (e.g., a stowed or closed configuration of FIG. 18A) to a second configuration (e.g., a deployed or open configuration of FIG. 19C). In this embodiment, the first component 22 is configured as fixed structure 92 included in a nacelle of the aircraft propulsion system. The second component 23 is configured as an axially translatable structure 94 included in a thrust reverser of the aircraft propulsion system. This axially translatable structure 94 includes a translating sleeve 96 and a translating cascade structure 98 fixedly connected to a forward end of the translating sleeve 96. The third component 24 is configured as another axially translatable structure 100 included in the thrust reverser. This axially translatable structure 100 is configured as or otherwise includes a translating blocker door carrier that pivotally supports one or more blocker doors 102 (one visible in the drawings). Each of these blocker doors 102 is connected to the axially translatable structure 94 (e.g., the cascade structure 98) via one or more respective links 104 (one visible in FIGS. 19B and 19C).

The motion depicted by FIGS. 18A-18D illustrates axial translation of both axially translatable structures 94 and 100. This movement causes the blocker doors 102 to substantially axially translate between the position of FIG. 18A and the position of FIG. 18D. The motion depicted by FIGS. 19A-19C illustrate axial translation of the axially translatable structure 94, where movement of the axially translatable structure 100 slows and then stops. This movement causes the blocker doors 102 to pivot radially inwards into a deployed position; e.g., see FIG. 19C. Since this pivoting movement of the blocker doors 102 is delayed, the blocker doors 102 can be stowed within a cavity 106 in a fixed thrust reverser structure 107 (e.g., see FIG. 18A) enabling the blocker doors 102 to be out of a bypass gas path 108 of the propulsion system when stowed.

Various other thrust reverser systems are known in the art. The motion control device 26 of the present disclosure may be configured with any such known or later developed thrust reverser system to replace a multi-actuator system and/or provide timing between two or more moving components.

In some embodiments, the operation of the motion control device 26 may be reversed such that deployment of the second and third components 23 and 24 occur when the mounts move axially closer together, opposed to farther apart as described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A kinematic system, comprising:
an outer cylinder;
a mid-cylinder within the outer cylinder, the mid-cylinder mated with the outer cylinder at a mid-outer threaded interface configured to transform axial translation of the outer cylinder into rotational motion of the mid cylinder along an axis; and
an inner cylinder within the mid-cylinder, the inner cylinder mated with the mid-cylinder at a mid-inner threaded interface configured to transform the rotational movement of the mid-cylinder into axial translation of the inner cylinder along the axis;

wherein a first one of the mid-outer threaded interface and the mid-inner threaded interface comprises a thread configured with a first thread portion and a second thread portion, the first thread portion is disposed at a first angle relative to the axis, and the second thread portion is disposed at a second angle relative to the axis that is different from the first angle.

2. The kinematic system of claim 1, wherein the first angle is an acute angle and the second angle is a substantially zero angle.

3. The kinematic system of claim 1, wherein the first thread portion is acutely offset from the axis, and the second thread portion is substantially parallel with the axis.

4. The kinematic system of claim 1, wherein the thread is further configured with a third thread portion disposed at a third angle relative to the axis that is different from the second angle.

5. The kinematic system of claim 4, wherein the third thread portion is between the first thread portion and the second thread portion.

6. The kinematic system of claim 1, wherein the mid-outer threaded interface comprises the thread.

7. The kinematic system of claim 1, wherein the mid-inner threaded interface comprises the thread.

8. The kinematic system of claim 1, wherein a second one of the mid-outer threaded interface and the mid-inner threaded interface comprises a second thread, and at least a portion of the second thread is disposed at a third angle relative to the axis that is substantially the same as the first angle.

9. The kinematic system of claim 1, wherein a second one of the mid-outer threaded interface and the mid-inner threaded interface comprises a second thread, and at least a portion of the second thread is disposed at a third angle relative to the axis that is different than the first angle and the second angle.

10. The kinematic system of claim 1, wherein a second one of the mid-outer threaded interface and the mid-inner threaded interface comprises a second thread configured with a third thread portion and a fourth thread portion, the third thread portion is disposed at a third angle relative to the axis, and the fourth thread portion is disposed at a fourth angle relative to the axis that is different from the third angle.

11. The kinematic system of claim 1, wherein the thread is further configured with an intermediate thread portion, and the intermediate thread portion is disposed at an angle relative to the axis that changes as the intermediate thread portion extends along the axis between the first thread portion and the second thread portion.

12. The kinematic system of claim 1, further comprising:
an outer cylinder mount fixedly connected to the outer cylinder, and configured to attach the outer cylinder to a first component;
a mid-cylinder mount rotatably, relative to the axis, connected to the mid-cylinder, and configured to attach the mid-cylinder to a second component; and
an inner cylinder mount fixedly connected to the inner cylinder, and configured to attach the outer cylinder to a first component.

13. The kinematic system of claim 1, further comprising:
a lost-motion control device comprising the outer cylinder, the mid-cylinder and the inner cylinder;
the lost-motion control device configured such that the outer cylinder axially translates relative to the mid-cylinder during a first portion of axial movement of the mid-cylinder; and
the outer cylinder does not axially translate relative to the mid-cylinder during a second portion of the axial movement of the mid-cylinder.

14. The kinematic system of claim 13, wherein the lost-motion control device is further configured such that the inner cylinder axially translates relative to the mid-cylinder during the first portion and the second portion of the axial movement of the mid-cylinder.

15. The kinematic system of claim 1, wherein the first one of the mid-outer threaded interface and the mid-inner threaded interface further comprises a ball screw engaged with the thread.

16. The kinematic system of claim 1, further comprising
a fixed structure, wherein the mid-sleeve is attached to the fixed structure;
a first movable component of a thrust reverser, wherein the outer cylinder is attached to the first movable component; and
a second movable component of the thrust reverser operable to move relative to the first movable component, wherein the inner cylinder is attached to the second movable component.

17. The kinematic system of claim 16, further comprising a blocker door and a link, wherein
the first movable component comprises a translating sleeve and a translating cascade;
the second movable component comprises a translating blocker door carrier;
the blocker door is pivotally connected to the translating blocker door carrier; and
the link connects and extends between the blocker door and the first moveable component.

18. A kinematic system, comprising:
an outer cylinder;
a mid-cylinder within the outer cylinder, the mid-cylinder mated with the outer cylinder at a mid-outer threaded interface configured to convert axial translation of the outer cylinder to rotational movement of the mid-cylinder along an axis; and
an inner cylinder within the mid-cylinder, the inner cylinder mated with the mid-cylinder at a mid-inner threaded interface configured to convert the rotational movement of the mid-cylinder into axial translation of the inner cylinder along the axis;
wherein a first one of the mid-outer threaded interface and the mid-inner threaded interface comprises a thread including a first thread portion and a second thread portion, the first thread portion is configured with a first thread pitch, and the second thread portion is configured with a second thread pitch that is different from the first thread pitch.

19. The kinematic system of claim 18, wherein the first thread portion is disposed at a first angle relative to the axis, and the second thread portion is disposed at a second angle relative to the axis that is different from the first angle.

20. A kinematic system, comprising:
an outer cylinder;
a mid-cylinder within the outer cylinder, the mid-cylinder mated with the outer cylinder at a mid-outer threaded interface configured to convert axial translation of the outer cylinder into rotational movement of the mid-cylinder along an axis; and
an inner cylinder within the mid-cylinder, the inner cylinder mated with the mid-cylinder at a mid-inner threaded interface configured to convert the rotational movement of the mid-cylinder into axial translation of the inner cylinder along the axis;

wherein a first one of the mid-outer threaded interface and the mid-inner threaded interface comprises a thread, and a first value of a pitch of the thread at a first location along the axis is different than a second value of the pitch of the thread at a second location along the axis.

* * * * *